UNITED STATES PATENT OFFICE.

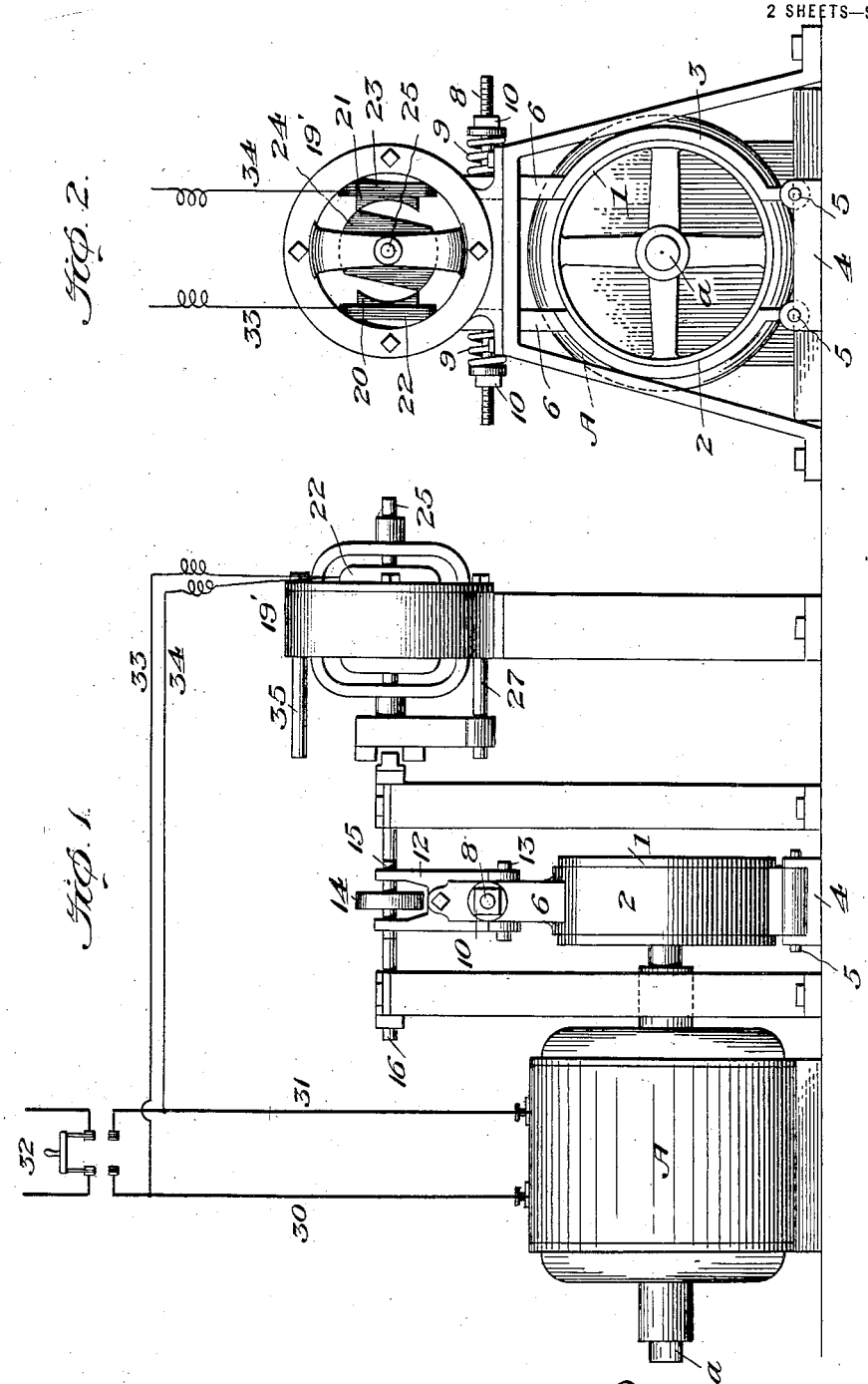

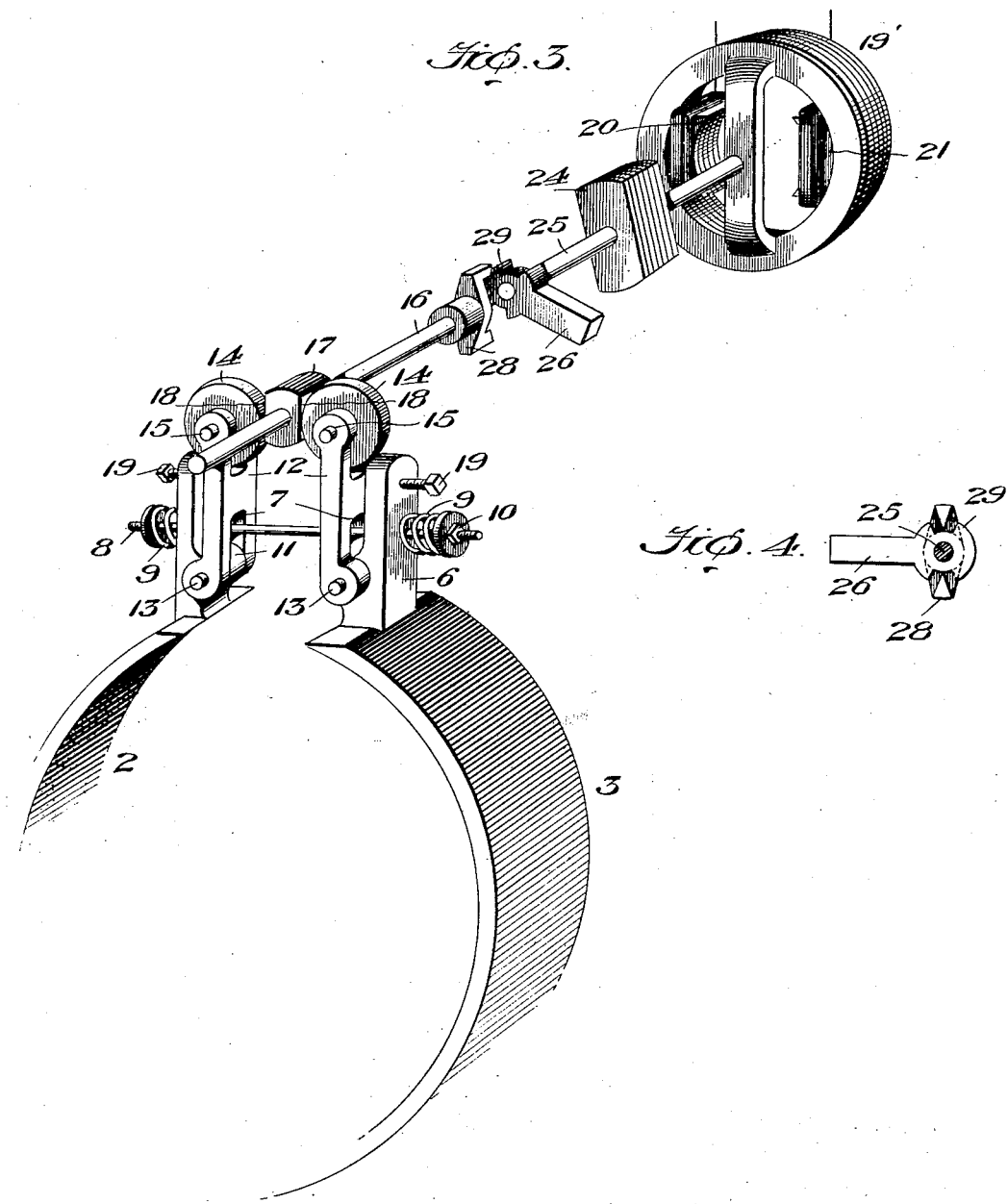

JOHN T. LEONARD, OF WICHITA, KANSAS.

BRAKE.

1,159,238.  Specification of Letters Patent.  Patented Nov. 2, 1915.

Application filed January 29, 1913. Serial No. 744,904.

*To all whom it may concern:*

Be it known that I, JOHN T. LEONARD, a citizen of the United States, residing at Wichita, in the county of Sedgwick and State of Kansas, have invented certain new and useful Improvements in Brakes, of which the following is a specification.

My invention relates to an improvement in brakes and more particularly to a friction brake which is operated by electrical means.

This brake is to be used in connection with an electric or other motor and is designed to automatically apply the brake and stop the motor when the current to the motor is cut off.

It is also designed to automatically release the brake when the motor current is applied and to permit normal running of the motor.

This invention consists of certain novel features of construction and combinations of parts which will be hereinafter more fully described and pointed out in the claims.

In the accompanying drawings—Figure 1 is a view in side elevation showing the device as applied to a motor; Fig. 2 is a view in end elevation of the mechanism disclosed in Fig. 1; Fig. 3 is a view in perspective of the main operating parts showing them detached, and Fig. 4 is a detail view of the dental connection in the clutch operating shaft.

The motor A has a brake drum 1 secured on the shaft $a$ thereof. Brake shoes 2 and 3 are provided to fit the outer circumference of the drum 1. A base 4 is secured vertically beneath the drum and the shoes 2 and 3 are pivoted by pins 5 in position to swing against and embrace the drum 1.

Brackets 6 are formed on the upper free ends of the brake shoes 2 and 3. An opening 7 is provided through each of the brackets 6 to be in parallel alinement and through these openings 7 a rod 8 is received. Springs 9, 9, are received on the ends of the rod 8 to bear against the outer face of the bracket 6 and their tension is adjusted through the medium of nuts 10, 10 which are received on the screw threaded ends of the rod 8. In this way the brake shoes 2 and 3 are normally held in engagement with the brake drum 1 secured on the shaft $a$ of the motor and the motor will be held against starting.

On the inner face of each of the brackets 6, a bearing 11 is provided and a yoke 12 is pivoted by a pin 13 to each of these bearings. On the upper end of the yokes 12, friction wheels 14, 14 are journaled to revolve on the pins 15, 15. A brake shaft 16 is mounted to extend between the friction wheels 14 and to have its center on a line drawn between the axis of rotation of the two wheels.

A roll 17 is secured on the brake shaft 16 between the wheels 14 and at two points diametrically opposite the roll 17 is cut away to have the flat sides 18. Adjusting screws 19 are received through the brackets 6 and bear on their ends against the yokes 12 so that the friction wheels 14 will, when the brake shoes 2 and 3 are seated against the brake drum 1, come in contact with the flat sides 18 of the roll 17. From this it will be seen that if the roll is turned a part revolution, say of approximately 90 degrees or one quarter ($\frac{1}{4}$) turn, the full diameter of the roll will be brought between the friction wheels 14, 14 carried on the brake shoes 2 and 3 and they will be forced outwardly away from the frame drum 1 against the tension of the springs 9 which bear against the brackets 6, thus releasing the brake and permitting free rotation of the motor shaft $a$ on which the brake drum 1 is secured.

As a means of rotating the shaft 16, I have provided a field structure 19′ which has the two poles 20 and 21 provided with the usual coils 22 and 23 respectively for energizing them. An armature 24 is mounted on an armature shaft 25 within the field structure and a weight 26 secured on the end of the armature shaft holds the armature normally in a position with its operating faces away from the pole faces, as better shown in Fig. 3, the movement of the weight 26 downwardly and consequently the position at which the armature normally reposes being fixed by a stop 27 carried on the field structure.

The brake shaft 16 and the armature shaft 25 are mounted to be in alinement and to revolve on the same axis, as it were. The shaft 16 carries the toothed member 28 of a dental coupling and the socket member 29 is shown in this instance as being formed on the weight 26 secured to the armature shaft.

The wires 30 and 31 which lead to the motor A, are connected to the usual switch 32 and thence with the line wires. The wires 33 and 34, which connect with the coils 22 and 23 respectively of the field poles, are connected to the wires 30 and 31 leading to the motor.

The operation of the device is as follows— When the parts are in the position shown in Figs. 1, 2 and 3, with the switch open, the motor would not be energized and would not have movement. The brake shoes 2 and 3 are in their normal position with their operating faces bearing against the brake drum and the motor shaft is held against rotation. When the switch 32 is thrown to connect with the line wires, the current passes through the wires 30 and 31 to the motor and consequently through the wires 33 and 34 to the coils of the field structure. The field structure is energized and the armature 24 is brought to a position parallel with the field poles. This gives the armature shaft approximately a quarter turn and the shaft is held against further rotation by the weight 26 engaging with a stop 35 carried by the field structure. As the dental coupling connects the armature shaft with the brake shaft, the brake shaft will turn a like distance and the roll 17 will be rotated so that its full diameter will be brought between the friction wheels 14, 14 carried by the brake shoes 2 and 3. This forces the brake shoes away from the brake drum against the tension of the springs 9 and permits the motor shaft $a$ to be rotated due to the current passing through the wires 30 and 31. When the switch is thrown out to stop the motor, the current through wires 33 and 34 to the field coils is also cut off, which deënergized the field poles. The armature shaft is again turned to bring the armature out of its parallelism with the field poles through the weight 26, and as the armature shaft and the brake shaft are connected by the dental coupling the roll will again be turned and a position with its flat sides between the friction wheels 14, 14, and the brake shoes 2 and 3 will bear against the brake drum 1, thus stopping the rotation of the motor shaft $a$ and holding it against abnormal rotation.

The socket 29 of the dental coupling is made preferably slightly larger than is necessary and the weight 26 is thus permitted of slight movement before the member 28 of the coupling is engaged to be thrown out. In this way a hammer blow is struck against the teeth of the member 28 and it is more readily turned.

It will thus be seen that a brake is provided which may be used in connection with an electric elevator or any other means where it is desirable that when the switch is thrown to cut off the power the motor is stopped immediately, and as the curved sides of the roll 17 are perfect arcs of a center taken on the axis of rotation of the brake shaft, and the friction wheels 14 are also perfect arcs, the brake shaft cannot be forced through the tension of the springs 9, and the operation will always be positive. Also, it will be seen that this structure as shown and described can be used with either alternating current or direct current and that slight modification might be made in the form, proportion and minor details without departing from the spirit or scope of my invention and it will be understood that I do not wish to limit myself to the exact construction herein set forth, but—

Having fully described my invention, what I claim as new and desire to secure by Letters Patent is—

1. In a brake, the combination with a drum, of shoes normally in engagement with the drum for holding the drum against movement, means for spreading the shoes apart to release the drum, means for actuating said means, magnetic means for operating said last mentioned means whereby the spreading means is actuated for causing the shoes to release the drum, said actuating means and magnetic means normally out of engagement, and adapted to be brought into engagement upon the operation of the magnetic means and means for operating said actuating means to cause said spreading means to return to its normal position.

2. In a brake, the combination with a drum, of shoes normally in engagement with the drum for holding the drum against movement, means for spreading the shoes apart to release the drum, means for actuating said means, magnetic means for operating said last mentioned means whereby the spreading means is actuated for causing the shoes to release the drum, said actuating means and magnetic means normally out of engagement and adapted to be brought into engagement upon the operation of the magnetic means.

3. A brake comprising, in combination with a motor and brake-drum secured to the shaft, brake-shoes pivoted adjacent the drum and in position to fit and engage therearound, spring-pressed means for holding the shoes normally in engagement with the drum, projections carried by the free ends of the shoes, a shaft mounted to turn between said projections, a cam secured to the shaft and shaped to normally permit the engagement of the shoes with the drum, and when turned to engage with the projections to move the shoes from their engagement with the drum, a second shaft mounted in alinement with said cam-shaft, a coupling between said shafts, magnetic means for turning said second shaft so that the first shaft is brought to a position with the cam in operative relation between the projections, and a weight carried by said second shaft in position to turn said first shaft when the magnetic means is deënergized so that the cam occupies its normal position.

In testimony whereof I affix my signature, in the presence of two witnesses.

JOHN T. LEONARD.

Witnesses:
 NORMAN H. BEEBE,
 GEORGE B. COLE.